United States Patent [19]

Black et al.

[11] Patent Number: 4,962,271
[45] Date of Patent: Oct. 9, 1990

[54] SELECTIVE SEPARATION OF MULTI-RING AROMATIC HYDROCARBONS FROM DISTILLATES BY PERSTRACTION

[75] Inventors: Laura E. Black, Sarnia, Canada; Robert C. Schucker, Baton Rouge, La.

[73] Assignee: Exxon Research and Engineering Company, Florham Park, N.J.

[21] Appl. No.: 452,887

[22] Filed: Dec. 19, 1989

[51] Int. Cl.$^5$ ............................................. C07C 7/144
[52] U.S. Cl. .................................. 585/819; 208/308; 210/651; 210/500.28; 210/500.38
[58] Field of Search ............................ 208/308; 502/4; 585/818, 819; 210/500.28, 500.36, 500.38, 651, 653

[56] References Cited

U.S. PATENT DOCUMENTS

| | | | |
|---|---|---|---|
| 2,930,754 | 3/1960 | Stuckey | 210/23 |
| 2,958,656 | 11/1960 | Stuckey | 210/23 |
| 2,970,106 | 1/1961 | Benning et al. | 208/347 |
| 3,140,256 | 7/1964 | Martin et al. | 210/23 |
| 3,370,102 | 2/1968 | Carpenter et al. | 260/674 |
| 3,556,991 | 1/1971 | Gerhold | 208/321 |
| 3,776,970 | 12/1973 | Strazik et al. | 585/819 |
| 3,784,620 | 1/1974 | Perry et al. | 585/819 |
| 4,115,465 | 9/1978 | Elfert et al. | 260/674 |
| 4,532,029 | 7/1985 | Black et al. | 208/308 |
| 4,571,444 | 2/1986 | Black et al. | 208/308 X |
| 4,670,151 | 6/1987 | Bitter | 210/641 |
| 4,914,064 | 4/1990 | Schucker | 502/4 |

FOREIGN PATENT DOCUMENTS 160140 11/1985 European Pat. Off. .
160142 11/1985 European Pat. Off. .

OTHER PUBLICATIONS

"Separation of $C_8$ Aromatic Isomers by Pervaporation through Commercial Polymer Membranes", McCandless, et al., J. Membrane Sci. 30 1987 (pp. 111-116).

Primary Examiner—Curtis R. Davis
Assistant Examiner—William C. Diemler
Attorney, Agent, or Firm—Joseph J. Allocca

[57] ABSTRACT

Membrane separation under perstraction conditions of a lube oil distillate is disclosed which produces a retentate rich in non-aromatics hydrocarbons and alkyl aromatic and a permeate rich in multi-ring aromatics. The recovered retentate is similar to a solvent extracted raffinate but possesses a higher concentration of alkyl-single ring aromatics. The membrane separation process is highly selective for removing multi-ring aromatics from the lube distillate.

10 Claims, No Drawings

SELECTIVE SEPARATION OF MULTI-RING AROMATIC HYDROCARBONS FROM DISTILLATES BY PERSTRACTION

BRIEF DESCRIPTION OF THE INVENTION

The present invention is directed to a process for the selective removal of alkyl substituted and alkyl heteroatom substituted multi-ring aromatic hydrocarbons having a mole % aromatic carbon content of less than 75% from lube oil distillates by selective permeation of the substituted multi-ring aromatics through a membrane under perstraction conditions.

BACKGROUND OF THE INVENTION

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e. aromatic, unsaturated, saturated, by permeating a portion of the mixture through a non-porous cellulose ether membrane and removing permeate from the permeate side of the membrane using a sweep gas or liquid. Feeds include hydrocarbon mixtures, naphtha (including virgin naphtha, naphtha from thermal or catalytic cracking, etc.).

U.S. Pat. No. 2,930,754 teaches a method for separating hydrocarbons e.g. aromatic and/or olefins from gasoline boiling range mixtures, by the selective permeation of the aromatic through certain cellulose ester non-porous membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation.

Beyond this, however, the selective removal of aromatics from lube oil distillate streams is also an important processing step in the production of lube and specialty oil base stocks. It is important to remove aromatics from such stocks in order to improve the viscosity index and oxidation/UV stability of the oil. Typically, the aromatics are removed from such lube-specialty oil distillates by solvent extraction using selective extraction solvents such as phenol, furfural, $SO_2$ or N-methyl-2-pyrrolidone (NMP). While these solvents are professed as being selective, their selectivity is between aromatic hydrocarbons on the one hand and non-aromatic hydrocarbons (e.g. saturates) on the other. In using such selective solvents some good lube molecules such as alkyl single ring aromatics are removed from the lube oil and wind up in the aromatics containing extract phase This results in a loss of yield as well as in a loss of beneficial characteristics the alkyl benzenes could impart to the lube oil insofar as alkyl benzenes have very high viscosity indices and are selectively resistant to oxidation. NMP typically removes multi-ring aromatics first followed by naphthenoaromatics, 1-ring aromatics and paraffins/isoparaffins/naphthenes, in that order. It is difficult to clearly and exclusively remove the multi-ring aromatics. The extract recovered from the extraction process typically contains, in addition to a high concentration of multi-ring aromatics, an appreciable concentration of naphthene aromatics, single ring aromatics and some paraffins/isoparaffins/-naphthenes. Thus, as previously stated, extraction results in the loss of some valuable lube molecules to the extract Thus, the selective removal of multi-ring aromatics from lube oil-specialty oil distillate fractions in a straight forward manner without resort to exotic solvent systems or complicated distillation would be highly attractive and a significant advantage to the industry.

Copending applications U.S. Ser. No. 108,822, filed Oct. 14, 1987 and OP-No. 3463 filed Apr. 11, 1989, both of which are filed in the name of Robert C. Schucker, are directed to aromatic polyurea-urethane membrane which is a symmetric, dense membrane characterized by possessing a urea index, defined as the percentage of the total of urea and urethane groups that are urea, of at least about 20% but less than 100%, an aromatic carbon content of at least about 15 mole %, a functional group density of at least 10 per 1000 grams of polymer, and a C=O/NH ratio of less than about 8. The membrane is shown as being useful for the separation of aromatic from non-aromatics, such as in upgrading aromatics containing streams in petroleum refineries, such streams being, for example, naphtha streams, heavy cat. naphtha streams, intermediate cat. naphtha streams, light aromatics streams boiling in the $C_5$–300° F. range, LCCO boiling in the 400°–650° F. range and in chemical applications, i.e. aromatics containing primarily short (i.e. methyl or ethyl) side chains. Those applications do not reveal that the membrane can be used to selectively remove alkyl substituted and alkyl/hetero-atom substituted multi-ring aromatics from lube oil-specialty oil distillate while substantially leaving the alkyl benzenes in the lube oil fraction.

Experimental work reported in Ser. No. 108,822, Examples 10 through 16, showed that selectivity to aromatics over paraffins correlates well with the mole percent aromatic carbon in the molecule. Selectivity to naphthalene (unsubstituted) over paraffins at 80° C. under perstraction conditions is higher than toluene or p-xylene because naphthalene is more aromatic.

By comparison, in the present application the feeds being separated are virgin lube stocks (i.e. distillates) wherein the aromatics have long alkyl side chains or alkyl/hetero-atom side chains. Perstraction involves the selective dissolution of particular components contained in a mixture into the membrane, the diffusion of these components through the membrane and the removal of the diffused components from the downstream side of the membrane by use of a liquid sweep stream. The aromatic molecules present in the feedstream dissolve into the membrane film due to similarities between the membrane solubility parameter and those of the aromatic species in the feed. Another expected constraint on the ability of molecules to dissolve or penetrate into the polymeric film, is the molecular size of the molecules. The size of molecules able to penetrate the film would be limited by the interchain spacing of the polymer. Molecules past a certain molecular weight would be unable to penetrate the film. Thus, it is unexpected that molecules with very high molecular weights of 600 g/mole and higher can penetrate into and diffuse across these membranes. Furthermore, the mole percent aromatic carbon in these molecules is definitely lower than 100% and probably lower than the 75% associated with the xylenes. The mole percent aromatic carbon is most probably lower than 50% because it is known that the aromatic molecules bear one or more alkyl side chains which can be 10 to 12 carbons long. Thus, it would be totally unexpected that molecules having these lower levels of aromaticity would still be more selectively permeated through the membranes than are the saturate molecules and even more unexpected that long alkyl side chain and alkyl/heteroatom side chain substituted multi-ring aromatics having lower mole % aromatic carbon than xylenes would be more selectively permeated through the membrane than the xylenes.

THE PRESENT INVENTION

It has been discovered that alkyl substituted and alkyl/hetero-atom substituted multi-ring aromatic hydrocarbons having less than 75 mole % aromatic carbon (i.e. aromatics having at least 2, preferably 3 or more rings, preferably fused rings and one or more alkyl side chains of about 6 to 12 carbon atoms or more in length, thus possessing a mole % aromatic carbon content of less than 75%) can be removed from lube and specialty oil distillates at a high level of selectivity by selective permeation of the substituted multi-ring aromatics through an aromatics selective membrane such as polyurethane imide, polyisocyanurate-urethane, and polyurea-urethane membranes under perstraction conditions.

Polyurea-urethane membranes useable in this process include the aromatic polyurea-urethane membranes which are the subject of U.S. Ser. No. 108,822 filed Oct. 14, 1987 and U.S. Ser. No. 336,172, filed Apr. 11, 1989 both in the name of Robert C. Schucker and characterized by possessing a urea index of at least 20% but less than 100% an aromatic carbon content of at least 15 mole %, a functional group density of at least about 10 per 1000 grams of polymer, and a C=ONH ratio of less than about 8.

The aromatic polyurea/urethane membrane is produced employing standard membrane casting procedures using an aromatic polyurea/urethane copolymer which is itself prepared by reacting dihydroxy or polyhydroxy compounds (e.g., polyethers or polyesters of about 250 to 5000 molecular weight, or mixtures of different molecular weight polymers of the same type, i.e. about 30:70/70:30 mixtures of an about 500 molecular wt. component (polyester or polyether) and an about 2000 molecular wt. component (polyester or polyether) with aliphatic, alkylaromatic or aromatic diisocyanates or polyisocyanates and low molecular weight chain extenders, such as diamines, polyamines or amino alcohols. The choice of the molecular weight of the polyether or polyester component is a matter of compromise. Polyether or polyester components of 500 molecular weight give membranes of highest selectivity, but lower flux. Polyesters or polyethers of higher molecular weight (e.g. 2000) give membranes of lower selectivity but higher flux. Thus, the choice of the single molecular weight or blend is a matter of choice and compromise between selectivity and flux. The ratio of these components used in producing the polyurea/urethane copolymer is governed by the aforementioned characteristics possessed by the membranes useful for aromatic from saturate separation. The copolymer produced possesses a urea index of at least about 20% but less than 100%, preferably at least about 30% but less than 100%, most preferably at least about 40% but less than 100%. By urea index is meant the percentage of urea groups relative to the total urea plus urethane groups in the polymer. The copolymer also contains at least about 15 mole percent, and preferably at least about 20 mole percent aromatic carbon, expressed as a percent of the total carbon in the polymer. The copolymer also possesses a particular density of functional groups (DF ratio) defined as the total of C=O+NH per 1000 grams of polymer, the density of functional group being at least about 10, preferably at least about 12 or greater. Finally, to insure that the functional groups are not mostly carbonyl, the C=O/NH ratio is less than about 8 and preferably less than about 5.0. This insures that there is sufficient hydrogen bonding within the polymer to result in strong polymer chain interactions and high selectivity.

As previously stated, the membranes are produced by standard casting techniques from a polyurea/urethane copolymer made from dihydroxy or polyhydroxy compounds, such as polyethers or polyester of 500 to 5000 molecular weight, reacted with aliphatic, alkylaromatic or aromatic diisocyanates or polyisocyanates and low molecular weight chain extenders, such as diamines, polyamines or amino alcohols.

The polyester components are prepared from aliphatic or aromatic dicarboxylic acids and aliphatic or aromatic dialcohols. Aliphatic dicarboxylic acids refer to those materials having the general formula HOOCRCOOH where R contains 2 to 10 carbons (and may be either a straight or branched chain configuration). Aromatic dicarboxylic acids refer to those materials having the general structure HOOCRCOOH where R is:

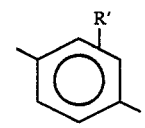    I

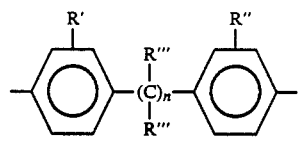    II wherein R', R" and R'" may be the same or different and are selected from the group consisting of H and $C_1$–$C_5$ carbons or $C_6H_5$ and combinations thereof, and n is 0 to 4. It is to be understood that in the above formula each R' or R" may itself represent a mixture of H, $C_1$–$C_5$ or $C_6H_5$.

Dialcohols have the general structure HOROH where R may be

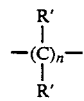    III

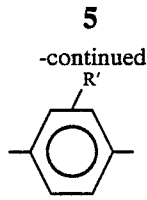

where n is 1 to 10, preferably 4 to 6, and R' is H, $C_1$ to $C_5$ or $C_6H_5$ or

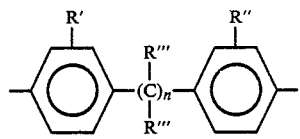

where R', R', R" and n are defined in the same manner as for the aromatic dicarboxylic acids. An example of a useful dialcohol is bisphenol A.

The diisocyanates are preferably aromatic diisocyanates having the general structure:

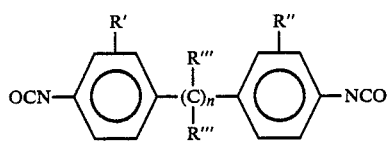

wherein R', R" and R''' are the same or different and are selected from the group consisting of H, $C_1$-$C_5$ and $C_6H_5$ and mixtures thereof and n ranges from 0 to 4.

Diamine chain extenders have the general formula $H_2NRNH_2$ where R includes aliphatic and aromatic moieties such as

where n is 1 to 10 and R' may be the same or different and are selected from the group consisting of H, $C_1$-$C_5$ carbons and $C_6H_5$ and mixtures thereof.

Also included are diamine chain extenders of the formula:

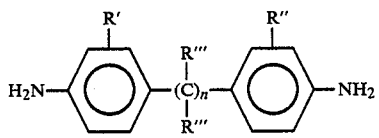

where R', R" and R''' are the same or different and are selected from the group consisting of H or Cl or a $C_1$ to $C_5$ or $C_6H_5$ and mixtures thereof and n ranges from 0 to 4.

Examples of the polyether polyols useful in the present invention as polymer precursors are polyethylene glycols, (PEG), polypropylene glycol (PPG), polytramethylene glycol, PEG/PPG random copolymers, etc. having molecular weight ranging from about 250 to 4000. Aliphatic diisocyanates which may be utilized are exemplified by hexamethylene diisocyanate (HDI), 1,6-diisocyanato-2,2,4,4-tetramethylhexane (TMDI), 1,4-cyclohexanyl diisocyanate (CHDI), isophorone diisocyanate (IPDI), while useful alkylaromatic diisocyanates are exemplified by toluene diisocyanate (TDI) and bitolylene diisocyanate (TODI). Aromatic diisocyanates are exemplified by 4,4'-diisocyanato diphenylmethane (MDI). Polyisocyanates are exemplified by polymeric MDI (PMDI) and carbodiimide modified MDI. Useful polyamines are exemplified by polyethyleneimines and 2,2',2" triaminotriethylamine. Useful amino alcohols are exemplified by 6-aminohexanol, 4-aminophenol, 4-amino-4'-hydroxyl-diphenylmethane.

The above are presented solely by way of example. Those skilled in the art, with the present teaching before them, can select from the innumerable materials available the various starting materials which upon combination as described herein will produce a polyurea/urethane copolymer having the desired characteristics which can then be cast into the membranes useful for the present invention.

The membranes are produced by preparing the corresponding polyurea/urethane copolymer in an appropriate solvent, such as dimethyl formamide (DMF), to produce a pourable or spreadable solution. Polymer concentration in this casting solution ranges between about 15-40 wt %, preferably about 20-25 wt %. The casting solution is then poured or spread on an appropriate support medium, such as a metal or glass plate or, if desired, a woven fiber backing, such as woven fiber glass, nylon, polyester, etc. can be used if solvent removal during the casting sequence employs a vacuum, but preferably, or a non-woven backing, such as porous polypropylene or porous teflon is employed. In general, however, backing materials used are those which are not attacked by the solvent(s) used to produce the polyurea-urethane copolymer casting solution.

The thin dense layer of selective membrane may be cast in any thickness, selective membrane layers (less backing) ranging in thickness of from about 0.1 to about 50 microns being preferred, thinner membranes about 0.1 to 5 microns being more preferred.

Alternatively a very thin layer of the polyurea/urethane copolymer can be deposited into a highly permeable, non-selective polyurethane layer producing a composite membrane comprising a thin dense layer of polyurea/urethane membrane about 0.1 to 5 microns thick on a permeable, non-selective, thick polyurethane. The thick layer of polyurethane (about 20 to 100 microns thick) serves as a support layer permitting one to produce thin, dense, selective layers of polyurea/urethane which would otherwise be mechanically unmanageable due to their thinness. Due to the chemical similarity between the polyurethane support layer and the polyurea/urethane selective layer, the two layers interact through hydrogen bonding to produce a very strong adhesion.

If one were to use this technique to produce sheet material, the thick, permeable polyurethane layer can be deposited on a suitable backing material such as porous fiber glass, polyethylene, polypropylene, nylon, teflon, etc. after which the thin, dense selective polyurea/urethane layer would be deposited onto the polyurethane layer.

In producing hollow fibers or tubes using this composite membrane technique, first a tube or fiber of permeable polyurethane is produced after which a thin dense layer of the selective polyurea/urethane material is deposited on either the outer or inner surface of the tube or fiber support.

The permeable polyurethane layer can be prepared from polyether glycols such as polypropylene glycol or polyethylene glycol plus aliphatic and/or aromatic diisocyanates (preferably aliphatic diisocyanates) using polyols (diols or triols) preferably aliphatic diols as chain extenders. These permeable polyurethane sublayers will possess characteristics well outside the minimums recited for the polyurea/urethane membranes taught herein. Polyurethane membrane materials which satisfy the above requirement of permeability are the polyurethane membranes described in U.S. Pat. No. 4,115,465.

Membrane made of the polymer possessing the recited characteristics can also be either anisotropic in form or be a thin film composite.

The preparation of an anisotropic polyurea/urethane membrane is the subject of copending application U.S. Ser. No. 108,821, filed Oct. 14, 1987 in the names of Feimer, Koenitzer and Schucker. The preferred anisotropic membrane is produced by preparing a casting solution of the polyurea/urethane copolymer having the above recited characteristics in a solvent containing less than about 5 vol. % non-solvent, preferably about 0 vol. % non-solvent, the preferred solvent being dimethylformamide, to produce a casting solution. A thin film of the casting solution is deposited on a support having a maximum pore size of less than about 20 microns (e.g. glass, metal, release paper, etc.), exposing the thin film on support to conditions of temperature and time such that the solvent vapor pressure-time factor is about 1000 mm Hg-min and less, preferably about 200 mm Hg-min and less, and quenching the membrane film in a non-solvent such as water yielding the desired anisotropic membrane. The aniso-tropic membrane produced possesses a three layer structure, a thin dense layer generated at the film/support interface, a thin non-continuous skin which is generated at the membrane-quench solvent interface and an open, porous structure which exists between the aforementioned thin dense layer and thin non-continuous skin layer.

Thin film composites can be prepared either from suspension deposition as taught in copending application U.S. Ser. No. 108,819 filed Oct. 14, 1987 in the name of Robert C. Schucker or from solution deposition as taught in copending application U.S. Ser. No. 108,820 filed Oct/ 14, 1987 in the name of Robert C. Schucker.

In U.S. Ser. No. 108,819, the thin film composite membrane constituting a thin layer of polymer deposited on a thick-permeable support layer is produced by preparing a fine dispersion of discrete polyurea/urethane polymer particles in a solvent which does not react with or dissolve the selected thick-permeable support layer. The dispersion is contacted with only one face of the support layer. The solvent is permitted to evaporate and the composite membrane results. The support layer will generally have pores ranging from 0.005 to 0.5 microns. Typical support include polyamide, polyimide, polyacrylonitrile, polybenzimidazole, teflon, cellulose acetate and polyolefins such as polyethylene and polypropylene.

The polymer suspension is deposited as a thin layer (about 2 microns or less on the support structure. Polymer concentration in the suspension-dispersion can range from about 0.5 to about 10%, preferably about 1 to about 5%, most preferably about 2%. Nondissolving solvents are 1,4-dioxane, cellosolve acetate, tetrahydrofuran, ketones (e.g. acetone) and aromatic solvents such as toluene or xylenes.

Thin film composites can also be produced from solutions, as taught in U.S. Ser. No. 108,820. In that procedure the polyurea/urethane copolymer is prepared in a solution consisting of (a) an aprotic solvent such as dimethylformamide (DMF) (b) a cyclic ether such as dioxane, (c) cellosolve acetate or methyl cellosolve and (d) a wetting agent such as crotyl alcohol to produce a casting solution which is then deposited as a thin film onto a microporous support, excess solution permitted to drain from the support, and the solvent permitted to evaporate leaving a thin active layer on the support backing. Supports which are insoluble in the solvents used to produce the casting solution are e.g. polyolefin (e.g. polyethylene and polypropylene) and teflon. The support possess a molecular weight cut-off in the range of about 10,000 to 100,000. The solvent is used in a parts per hundred ratio of a/b/c/d in the range about 3-27/94-33/2-33/1-7. The polymer concentration in the solution can range up to about 40 parts or more polymer in the solution based on 100 parts solvent. Preferred polymer concentration is in the range 0.5 to 20 parts polymer, preferably 1-10 parts polymer, more preferably 1-5 parts polymer per 100 parts solvent.

Due to the extreme thinness of the dense selective polyurea/urethane layer the composite membrane exhibits extremely high flux while maintaining a very high degree of selectivity.

The solvent is permitted to evaporate with the application of heat if needed to drive off the solvent. If a solvent of a low enough vapor pressure is employed the application of heat can be omitted.

Application U.S. Ser. No. 452,889, filed 12/19/89 in the names of Feimer and Koenitzer reaches another technique for producing integrally supported thin film (0.1 to 10 $\mu$) composite membranes from solution.

According to that application, a high flux, thin film composite membranes comprising a thin, dense, selective film of polyurethane, polyurea/urethane, polyurethane imide, or polyurea/polyurethane copolymer alloy on a microporous hydrophobic support backing are prepared by wash coating an optimum wetting solution of the polymer in solvent onto the hydrophobic support. The viscosity of the wetting solution of polymer in solvent should be between 5 and 100 cps, preferably between 10 and 50 cps and more, preferably between 20 and 40 cps. The optimum solution viscosity can be obtained, for example, by either adding viscosity modifiers, adjusting the polymer concentration/solvent composition or preferably by aging the solution.

The solvent(s) must possess the optimum wetting characteristics such that the solution wets the surface but does not soak into the pores of the hydrophobic microporous support. For example, with a solvent mixture of dimethylformamide (high solvency) and acetone (low surface tension) complete soak through can be obtained at high acetone concentrations while non-wetting conditions result at high dimethylformamide concentrations. Thus, dimethylformamide/acetone solvent ratios between 20/80 and 80/20 yield the optimum wetting conditions without soak through.

The surface tension at 20° C. of the low surface tension solvent should be less than 35 dyne/cm, preferably less than 30 dyne/cm and more preferably less than 25 dyne/cm. The surface tension of acetone at 20° C. is 23 dyne/cm. Other examples of low surface tension solvents are toluene, heptane and hexane. Solvents with high solvency (good solvents) are characterized by a high polar solubility parameter. The polar solubility parameter at 25° C. of a good solvent should be greater than 3 (cal/cc)$^{\frac{1}{2}}$, preferably greater than 5 (cal/cc)$^{\frac{1}{2}}$, and more preferably greater than 7 (cal/cc)$^{\frac{1}{2}}$. *Dimethylformamide has a polar solubility parameter of* 8.07 (cal/cc)$^{\frac{1}{2}}$. Other examples of good solvents are dimethylsulphoxide and dimethylacetamide.

The solvent used in the membrane preparation process will comprise a mixture of high solvency solvent and low surface tension solvent used in a ratio of about 10/90 to 90/10, preferably about 20/80 to 80/20, most preferably about 40/60 to 60/40.

Aging the polymer solution unexpectedly produces composite membranes of higher selectivity as compared to thin film composite membrane made using a polymer solution of the same composition but which was not aged. Aging is practiced as a means for increasing the viscosity of the polymer solution. If the polymer solution, without aging, is between 5 and 100 cps then aging is not necessary, although it may be practiced as an additional, optional step to further enhance the performance of the final composite membrane. The polymer solution is aged for at least 1 day, preferably at least 3 days, more preferably at least 7 days. Aging is accomplished by permitting the polymer solution to stand at room temperature.

The concentration of polymer in the solvent is in the range of about 10 wt % and less, preferably 0.5 to 8 wt %, most preferably 0.5 to 5 wt %. Polymer concentrations at the upper end of the recited range will produce solutions possessing a viscosity in the desired range without aging, but will also result in the production of membrane layers at the thicker end of the 0.1 to 10 $\mu$ range. Thinner membrane layers are produced using lower concentrations of polymer in solvent solutions but such low polymer concentrations will require that the solution be aged in order to possess a viscosity in the desired range.

Polyurethane imides are produced by endcapping a polyol selected from those recited above with a polyisocyanate also selected from those recited above followed by chain extending by reaction with a polyanhydride which produces the imide directly or with di or poly carboxylic acids which produce amic acid groups which can be chemically or thermally condensed/cyclized to the imide. Aliphatic and cycloaliphatic di- and polyisocyanates can be used as can be mixtures of aliphatic, cycloaliphatic, aralkyl and aromatic polyisocyanates. Polyurethane imide membranes and their use for aromatics/non-aromatics separation are the subject of copending application U.S. Ser. No. 391,068 filed Aug. 9, 1989 in the name of Bernd A. Koenitzer.

Isocyanurate crosslinked polyurethane membranes and their use for the separation of aromatics from non-aromatics is the subject of copending application U.S. Ser. No. 391,058 filed Aug. 9, 1989 in the name of Robert C. Schucker. The isocyanurate crosslinked polyurethane membrane is produced by preparing an end capped isocyanate prepolymer of polyurethane by reacting dihydroxy or polyhydroxy compounds (e.g. polyethers or polyesters) with aliphatic, alkylaromatic or aromatic di or poly isocyanates and trimerizing this isocyanate end-capped polyurethane using a standard trimerization catalyst such as N,N',N''-tris(dimethylaminopropyl)-s-hexahydrotriazine, Sodium ethoxide, Potassium octoate, N-Hydroxypropyl-trimethylammonium-2-ethylhexanote, Potassium 2-ethylhexanoate, Trialkyl phosphines, 2,4,6-Tris(dimethylaminomethyl)-phenol and mixtures thereof. Using these catalyst yields a mixture which slowly thickens due to crosslinking accounted for by the formation of isocyanurate crosslinked rings. Before this mixture becomes too thick, it is deposited as a thin film on an appropriate substrate and permitted to fully gel, after which the membrane coat is treated to complete the formation of isocyanurate crosslinked polyurethane. This final treat can constitute no more than waiting a sufficiently long time to be certain that trimerization is complete. More likely this final treat will involve various degrees of drying followed, preferably, by heating to complete the trimerization to the isocyanurate crosslinked polyurethane.

As previously stated the present process is directed to the selective separation of alkyl substituted and alkyl-/hetero-atom substituted multi-ring aromatics having less than 75 mole percent aromatic carbon from single ring aromatics and substituted single ring aromatics (e.g. alkyl benzenes) such as toluene and the xylenes, nitro-benzenes, etc.) and non-aromatics under perstraction conditions using a membrane, particularly the aforementioned polyurea/urethane membrane. The term "Multi-ring aromatics", as used in the application, is meant to include condensed and fused ring aromatics as well as molecules such as biphenyl, diphenyl methane, tri-phenyl methane, etc and spiro system aromatics consisting of two rings having one atom in common.

The feed streams which are suitable sources of multi-ring aromatics which can be separated from single ring aromatics and non-aromatics are virgin hydrocarbon streams with very high molecular weights, particularly the high boiling distillate oils, those having an initial boiling point above about 350° C., preferably above about 375° C. These virgin and preferably distillate oils are identified or described as being oils boiling in the lube oil or specialty oil range. The various grades of lube oil from, for example 60N to 1200N and on into the Bright Stock range cover a broad range of molecular weight, ranging from 200 to 600 g/mole and higher. Boiling points beyond 1000° F. (530° C.) are not uncommon.

The separation is accomplished under perstraction conditions.

Perstraction involves the selective dissolution of particular components contained in a mixture into membrane, the diffusion of those components through the membrane and the removal of the diffused components from the downstream side of the membrane by use of a liquid sweep stream. In the perstractive separation the aromatic moleculars present in the feedstream dissolve into the membrane film due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simply distillation. Suitable sweep liquids, therefore, would include, for example $C_3$ to $C_6$ saturated hydrocarbons and lube basestocks ($C_{15}$–$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not.

If $C_3$ or $C_4$ sweep liquids are used at 25° C. or above in liquid state, the pressure must be increased to keep them in the liquid phase.

The present invention will be better understood by reference to the following Examples which are offered by way of illustration and not limitation.

EXAMPLE 1

Three distillates, Baytown coastal 60N, Arab Light 150N and Arab Light 600N were used as feeds. These oils had boiling ranges of 250° C. to 460° C., 330° C. to 500° C., and 375° C. to 625° C. respectively. Samples of a polyurea-urethane membrane were used in the perstraction experiments. This membrane was prepared as follows. A prepolymer was prepared by endcapping polyethylene adipate (molecular weight 2000) with 4,4-diphenylmethane diisocyanate (also referred to as methylene diisocyanate or MDI) in a 1:2 mole ratio at 95° C. for 2 hours. The prepolymer was then dissolved in dimethyl formamide (DMF) and chain extended with an equimolar amount of 4,4-methylene dianiline. A solution of this polymer in DMF was cast on a glass plate. After the solvent evaporated, the membrane was removed from the plate and was ready for testing.

The membrane was tested under perstraction conditions with the different distillate feeds by stirring a sample of distillate feed on one side of the membrane and circulating a heptane sweep solvent on the other side. The temperature was maintained at either 50° C. or 80° C. No pressure was applied to the membrane. The permeated fraction of the distillate accumulated in the pot of the distillation still used to recirculate pure heptane on the downstream side of the membrane. At the end of the experiment, the permeate was recovered by distilling off the heptane.

The leftover feed, or the retentate, was collected and weighed. The retentate contained some heptane due to the back diffusion of heptane through the membrane and the amount of this heptane was measured. The oil and heptane permeabilities and the amount of permeate recovered were calculated for each experiment. The permeate recovery ranged from 1.25 to 6.3 wt %.

The distillate and permeate samples were further characterized by the following techniques. The boiling range was measured by GCD. The aromatics and saturates in each sample were measured by liquid chromatography. The aromatic and saturate fractions obtained were analyzed by mass spec 21- type analysis for aromatics ASTM D3239-76 and by mass spec analysis method MS 2786- determination of hydrocarbon types in saturate gas oil fractions.

The data in Table 1 demonstrates that aromatics were selectively removed from all of the distillate feeds with overall selectivity factors for aromatics ranging from 9.8 to 30. The data in Tables 2, 3 and 4 demonstrate that multi-ring aromatics permeated through the membrane more selectively than did single ring aromatics.

The average carbon number of the Coastal 60N distillate was 16. The 2-ring aromatics in this feed would have an average aromaticity of 62.5 to 75 mole % aromatic carbon and showed a high permeation selectivity factor of 12.3 at 80° C. The average carbon number of the 150N distillate was 26. The 2-ring aromatics in this feed would have an average aromaticity of 38.5 to 46.2 mole % aromatic carbon and showed a high permeation selectivity factor of 36 at 80° C. The average carbon number of the 600N distillate was 37. The 2-ring aromatics in this feed would have an average aromaticity of 27.0 to 32.4 mole % aromatic carbon and showed a high permeation selectivity factor of 21 at 80° C. Thus, these molecules exhibit surprisingly high selectivities based on their low degree of aromaticity.

TABLE 1

PERSTRACTION RESULTS FOR OIL DISTILLATES
Membrane = polyurea urethane prepared from 2000 MW polyethylene adipate, methylene dianiline and methylene diisocyanate
Sweep Solvent = heptane

|  | Coastal 60N | Arab Light 150 | Arab Light 600N |
|---|---|---|---|
| Temperature °C. | 50 80 | 80 | 80 |
| Aromatics in Distillate, vol % | 39.8 39.8 | 52.2 | 62.0 |
| Permeate Yield wt %$^{(a)}$ | 3.3 6.3 | 1.25 | 2.6 |
| Aromatics in Permeate, vol % | 88.5 85.9 | 97.1 | 97.2 |
| Selectivity Factor$^{(b)}$ for Total Aromatics | 12.0 9.8 | 30 | 21 |
| Oil Permeability$^{(c)}$ (kg μ/m² day) | 24 89 | 31 | 21 |
| Heptane Permeability (kg μ/m² day) | 32 97 | 65 | 82 |

$^{(a)}$% Permeate Yield = $\dfrac{\text{wt permeate}}{\text{wt initial feed}} \times 100$ $^{(b)}$Selectivity Factor = $\dfrac{\dfrac{(\text{vol \% aromatics})}{(\text{vol \% saturates})_{permeate}}}{\dfrac{(\text{vol \% aromatics})}{(\text{vol \% saturates})_{feed}}}$ $^{(c)}$Permeability = Measured permeation rate × membrane thickness (μ) i.e. permeation rate as if the membrane were 1μ thick (most of membranes tested were 5–10 microns thick)

TABLE 2

COMPOSITIONAL ANALYSIS OF COASTAL 60N DISTILLATE AND PERMEATES

|  | Feed | Permeate at 50° C. | SF* at 50° C. | Permeate at 80° C. | SF* at 80° C. |
|---|---|---|---|---|---|
| Aromatics (vol %) |  |  |  |  |  |
| alkyl benzenes | 6.8 | 4.9 | 3.8 | 4.8 | 3.0 |
| naphthenoaromatics | 12.2 | 11.7 | 5.0 | 12.7 | 4.5 |
| 2-ring aromatics | 14.6 | 43.6 | 15.7 | 41.8 | 12.3 |
| 3-ring aromatics | 1.9 | 11.4 | 31 | 10.3 | 23 |
| 4+ring aromatics | 0.8 | 1.2 | 7.7 | 1.5 | 8.0 |
| benzothiophenes | 1.8 | 3.4 | 9.9 | 3.6 | 8.7. |
| multi-ring S aromatics | 1.8 | 12.3 | 36 | 11.1 | 26 |
| unidentified aromatics | 0 | 0 | — | 0 | — |
|  | 39.8 | 88.5 |  | 85.9 |  |
| Saturates (vol %) |  |  |  |  |  |
| paraffins | 18.4 |  |  |  |  |
| 1-ring | 11.7 |  |  |  |  |
| 2-ring | 12.2 |  |  |  |  |
| 3-ring | 9.2 |  |  |  |  |
| 4-ring | 8.7 |  |  |  |  |
| 5-ring | 0 |  |  |  |  |
| 6-ring | 0 |  |  |  |  |

TABLE 2-continued

COMPOSITIONAL ANALYSIS OF COASTAL 60N DISTILLATE AND PERMEATES

| Feed | Permeate at 50° C. | SF* at 50° C. | Permeate at 80° C. | SF* at 80° C. |
|---|---|---|---|---|
| 60.2 | 11.5 | | 14.1 | |

*SF = selectivity factor for aromatics $$= \frac{\left(\frac{\% \text{ aromatic component}}{\% \text{ total saturates}}\right)_{permeate}}{\left(\frac{\% \text{ aromatic component}}{\% \text{ total saturates}}\right)_{feed}}$$

for example - for permeate at 50° C.

$$\text{selectivity factor for alkyl benzenes} = \frac{4.9/11.5}{6.8/60.2} = 3.8$$

TABLE 3

COMPOSITIONAL ANALYSIS OF ARAB LIGHT 150N DISTILLATE AND PERMEATES

| | Feed | Permeate at 80° C. | Selectivity Factor for Aromatic Components |
|---|---|---|---|
| Aromatics (vol %) | | | |
| alkyl benzenes | 6.2 | 0.1 | 0.3 |
| naphthenoaromatics | 9.9 | 7.5 | 12.3 |
| 2-ring aromatics | 9.9 | 21.8 | 36 |
| 3-ring aromatics | 5.8 | 16.8 | 47 |
| 4+ring aromatics | 5.1 | 16.7 | 53 |
| benzothiophenes | 4.7 | 4.9 | 17 |
| multi-ring S aromatics | 6.2 | 24.4 | 63 |
| unidentified aromatics | 4.6 | 4.9 | 17 |
| | 52.2 | 97.1 | |
| Saturates (vol %) | | | |
| paraffins | 26.5 | | |
| 1-ring | 5.5 | | |
| 2-ring | 6.0 | | |
| 3-ring | 4.4 | | |
| 4-ring | 3.1 | | |
| 5-ring | 1.4 | | |
| 6-ring | 0.7 | | |
| | 47.8 | 2.9 | |

TABLE 4

COMPOSITIONAL ANALYSIS OF ARAB LIGHT 600N DISTILLATE AND PERMEATES

| | Feed | Permeate at 80° C. | Selectivity Factor for Aromatic Components |
|---|---|---|---|
| Aromatics (vol %) | | | |
| alkyl benzenes | 5.0 | 3.5 | 9.3 |
| naphthenoaromatics | 11.2 | 6.6 | 7.8 |
| 2-ring aromatics | 9.8 | 15.4 | 21 |
| 3-ring aromatics | 6.2 | 11.8 | 25 |
| 4+ring aromatics | 5.6 | 15.4 | 36 |
| benzothiophenes | 5.3 | 4.1 | 10 |
| multi-ring S aromatics | 5.6 | 13.2 | 32 |
| unidentified aromatics | 3.4 | 27.2 | 27 |
| | 62.0 | 97.2 | |
| Saturates (vol %) | | | |
| paraffins | 13.8 | 1.0 | |
| 1-ring | 7.9 | 0.6 | |
| 2-ring | 6.1 | 0.4 | |
| 3-ring | 5.6 | 0.4 | |
| 4-ring | 2.4 | 0.2 | |
| 5-ring | 0.9 | 0.1 | |
| 6-ring | 0.3 | 0 | |
| | 38 | 2.8 | |

(i) Baytown Coastal 60N Distillate

As shown in Table 1, overall selectivity factors for the separation of aromatics from saturates in 60N Coastal distillate, were 12.0 at 50° C. and 9.8 at 80° C. The oil permeabilities through the membrane (the flux of a 1 micron thick membrane) increased from 24 kgµ/m² day to 89 kgµ/m² day over the same temperature range. The slight decrease in selectivity and the increase in flux with an increase in temperature are normally expected.

An appreciable amount of heptane backdiffused through the membrane into the feed. The heptane permeability at 80° C. was 97 kgµ/m² day. If a higher molecular weight sweep solvent was used instead of heptane, this permeability might be lower. The backdiffusion cannot, however, be eliminated.

The selectivity factor of 9.8 at 80° C. for total aromatics is a function of the molecular weight of the saturates in the feed, the type and molecular weight of the aromatics and the total concentration of aromatics in the feed. This sample of Baytown Coastal 60N distillate had an average carbon number of 16 and contained 39.8 vol % aromatics (Table 2). Single ring aromatics (alkyl benzenes and naphthenoaromatics) comprised 19% of the feed or 48% of the aromatics present. At 80° C., the membrane showed only modest selectivity factors for these aromatics of 3.0 and 4.5. The 2-ring and 3-ring aromatics had much higher 80° C. selectivity factors of 12.3 and 23. The effect of multi-ring aromatics having higher selectivity factors than single ring aromatics is similar to that observed with heavy cat naphtha involving unsubstituted naphthalene and xylenes and reported in copending application U.S. Ser. No. 108,822 filed Oct. 14, 1987 in the name of Robert C. Schucker, but is totally unexpected because of the lower aromatic carbon content of the substituted multi-ring aromatics as compared to the xylenes and unsubstituted napthalene. The polyureaurethane membrane is more selective to molecules with a higher degree of aromaticity, its selectivity re substituted multi-ring aromatics having less than 75 mole % aromatic carbon is unexpected. The 80° C. selectivity factor for 4+ ring aromatics was lower than expected relative to other feeds and the 3-ring selectivity at 8.0 but this was probably due to errors in the mass spec measurement at the very low concentration of 4+ ring species. Benzothiophenes showed a selectivity factor of 8.7 and multi-ring sulphur aromatics 26. Overall, the membrane selectivity permeated multi-ring aromatics versus single ring aromatics.

The boiling point distribution of 60N distillate and the permeate were very similar with the permeate being, on average, 6° to 10° C. lower in temperature.

(ii) Arab Light 150N Distillate

As shown in Table 1, the overall selectivity factor for the separation of aromatics from saturates in Arab Light 150N distillate was 30° at 80° C. which was much higher than the selectivity factor of 9.8 observed with the 60N distillate. The oil permeability through the membrane was 31 kgµ/m² day at 80° C., significantly lower than the 89 with the 60N distillate. This sample of 150N distillate had an average carbon number of 26 and contained 52.2 vol % aromatics. The higher molecular weight of the feed is probably the cause of the lower oil permeability. The heptane permeability through the membrane into the feed was still appreciable at 65 kgµ/m² day. With this feed (Table 3) single ring aromatics (alkyl benzenes and naphthenoaromatics) comprise 16.1 vol % of the feed or 31% of the aromatics. The multi-ring aromatics comprise 69% of the aromatics. The multi-ring aromatics are present in a higher ratio than with the 60N distillate (52% of total aromatics present). This difference is one explanation why the overall selectivity factor has a high value of 30 as a greater percentage of multi-ring aromatics are present; as noted above, the membrane is more selective for multi-ring aromatics than single-ring aromatics.

The membrane showed selectivity factors for alkyl benzenes and naphthenoaromatics of 0.3 and 12.3. The selectivity factor for alkyl benzenes is abnormally low as the mass spec analysis detected only a negligible amount (0.1) of alkyl benzenes in the permeate. This may have been caused by an error in the mass spec analysis. The 2-ring, 3-ring and 4+ring aromatics have much higher selectivity factors of 36, 47 and 53 respectively. Again, the molecules with a higher degree of aromaticity show higher selectivity factors. Benzothiophenes showed a selectivity factor of 17, multi-ring S aromatics 63 and unidentified aromatics (4.6 vol % in feed) showed a selectivity factor of 17.

The boiling point distribution of the Arab Light 150N distillate and the permeate were different with the permeate being, on average, 22° C. lower in temperature. This may imply that the highest boiling point aromatic species did not permeate through the membrane.

(iii) Arab Light 600N Distillate

As shown in Table 1, the selectivity factor for the separation of aromatics from saturates in Arab Light Distillate 600N was 21 at 80° C., again much higher than the 9.8 observed with the 60N distillate. The oil permeability at 80° C. was 21 kgμ/m² day, lower than the 31 observed With the 150N distillate. This sample of 600N distillate has an average carbon number of 37 and contained 62.0 vol % aromatics. The higher molecular weight of this feed may be responsible for the lower permeability. The heptane permeability through the membrane into the feed was still appreciable at 82 kgμ/m² day. With this feed (Table 4), single-ring aromatics (alkyl benzenes and naphthenoaromatics) comprise 16.2 vol % of the feed or 26% of the aromatics present (Table 4). This feed has a high concentration of multi-ring aromatics and would be expected to show high selectivity factors. It is difficult to predict exactly what the selectivity factor would be, however, as the total concentration or aromatics also affects it. Higher aromatic feed concentrations tend to give rise to lower selectivity factors and higher fluxes.

The membrane showed selectivity factors for alkyl benzenes and naphthenoaromatics of 9.3 and 7.8. The 2-ring, 3-ring, and 4+ring aromatics had much higher selectivity factors of 21, 25, and 36 respectively. Benzothiophenes showed a selectivity factor of 10, multi-ring S aromatics 32 and the unidentified aromatics (13.4 vol % in feed) showed a selectivity factor of 27.

The saturate fractions of the distillate and the permeate showed little change in the ratio of saturate species present. Of the 38 vol % saturates in the feed, 13.8 vol % (based on total feed) were paraffins. The rest were naphthenes. Looking at the saturates only, 36% were paraffins. The permeate contained only 2.8 vol % saturates and the percentage of saturates that were paraffins was again 36%, the remainder were cyclic saturates. Some caution should be used in interpreting this result, however, as the mass spec analysis may not be very accurate at low concentrations. Overall, the membrane appears to show little discrimination among the saturate species present.

The boiling point distribution of Arab Light 600N distillate and the permeate were again different with the permeate being, on average, 22° C. lower in temperature. It appears that the highest boiling aromatic species might not be permeating through the membrane.

What is claimed is:

1. A method for separating alkyl substituted and alkyl/hetero-atom substituted multi-ring aromatic hydrocarbons having less than 75 mole % aromatic carbon from distillates containing mixtures of said hydrocarbons with single ring aromatics and non-aromatics by contacting the distillate under perstraction conditions with a selective membrane and permeating the alkyl substituted and alkyl/hetero-atom substituted multi-ring aromatic through said membrane.

2. The method of claim 1 wherein the alkyl substituted multi-ring aromatic is selected from two ring, three ring, and four ring aromatics bearing one or more alkyl side chains containing sufficient nonaromatic carbon so that the aromatic molecule has less than 75 mole % aromatic carbon.

3. The method of claim 1 wherein the multi-ring aromatics are fused multi-ring aromatics.

4. The method of claim 1 wherein the membrane is polyurea/urethane.

5. The method of claim 1 wherein the membrane is polyurethane imide.

6. The method of claim 1 wherein the membrane is polyurethane-isocyanurate.

7. The method of claim 4, 5 or 6 wherein the membrane is supported on a backing.

8. The method of claim 7 wherein the backing is teflon.

9. The method of claim 1 wherein the feed which is separated is selected from high boiling distillate.

10. The method of claim 9 wherein the distillate has an initial boiling point above about 350° C.

* * * * *